(12) United States Patent
Kawano et al.

(10) Patent No.: US 6,909,684 B2
(45) Date of Patent: Jun. 21, 2005

(54) OPTICAL RECORDING MEDIUM, HOLOGRAPHIC RECORDING AND/OR RETRIEVAL METHOD AND HOLOGRAPHIC RECORDING AND/OR RETRIEVAL APPARATUS

(75) Inventors: Katsunori Kawano, Nakai-machi (JP); Jiro Minabe, Nakai-machi (JP); Masaaki Shimizu, Nakai-machi (JP); Tatsuya Maruyama, Nakai-machi (JP); Shin Yasuda, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 587 days.

(21) Appl. No.: 10/011,710

(22) Filed: Dec. 11, 2001

(65) Prior Publication Data

US 2002/0163873 A1 Nov. 7, 2002

(30) Foreign Application Priority Data

Mar. 22, 2001 (JP) ........................................ 2001-083773

(51) Int. Cl.$^7$ ................................................ G11B 7/00
(52) U.S. Cl. ................ 369/103; 369/275.1; 369/112.01
(58) Field of Search .......................... 369/103, 112.01, 369/112.1, 112.15, 112.27, 46.11, 44.14, 44.28, 275.1, 275.2, 275.4

(56) References Cited

U.S. PATENT DOCUMENTS 5,776,634 A * 7/1998 Ohkuma et al. ................. 430/2
6,058,232 A * 5/2000 Lee et al. ...................... 385/39
6,418,106 B1 * 7/2002 Stoll .......................... 369/103
6,556,531 B1 * 4/2003 Yagi et al. .................. 369/103

FOREIGN PATENT DOCUMENTS

JP        A 9-101735        4/1997

OTHER PUBLICATIONS

Katsunori Kawano et al., "Holographic recording and retrieval of polarized light by use of polyester containing cyanoazobenzene units in the side chain", Optic Letters, vol. 24, No. 18, Sep. 1999.

* cited by examiner

*Primary Examiner*—Muhammad Edun
(74) *Attorney, Agent, or Firm*—Oliff & Berridge PLC

(57) ABSTRACT

A holographic recording and/or retrieval method and apparatus are provided. An optical recording medium is used which has a recording layer, formed on a surface of a transparent substrate, through which light having an incident angle of a predetermined value or more with respect to the surface is guided, and which changes a refractive index or absorption coefficient upon simultaneous irradiation of signal light of a predetermined wavelength and reference light, and can record holograms by holding the changed refractive index or absorption coefficient. During recording, a hologram is recorded by simultaneously irradiating the recording layer with signal light of predetermined wavelength and reference light. During retrieval, reading light of wavelength that does not change a refractive index or absorption coefficient of the recording layer is guided through the recording layer, and a hologram is retrieved by diffracted light produced when the reading light is guided through the recording layer.

18 Claims, 9 Drawing Sheets

HOLOGRAM

POLARIZATION DISTRIBUTION OF OBJECT LIGHT

RETRIEVAL LIGHT
(POLARIZER DIRECTION 0°)

RETRIEVAL LIGHT
(POLARIZER DIRECTION 90°)

$|T_1|^2$ $|T_2|^2$ $|T_1+T_2|^2$ $|T_1-T_2|^2$

OPTICAL RECORDING MEDIUM, HOLOGRAPHIC RECORDING AND/OR RETRIEVAL METHOD AND HOLOGRAPHIC RECORDING AND/OR RETRIEVAL APPARATUS

BACKGROUND OF THE INVENTION

1. Field of the Invention

The present invention relates to an optical recording medium, a holographic recording and/or retrieval method, and a holographic recording and/or retrieval apparatus, and more particularly to an optical recording medium having a holographic memory, a holographic recording and/or retrieval method, and a holographic recording and/or retrieval apparatus that can record three-dimensional images, two-dimensional images, or digital data pages.

2. Description of the Related Art

Two-dimensional memories typified by digital versatile disk (DVD) are used as high-capacity and high-density recording media. These two-dimensional memories have been made highly dense by making recording laser wavelength shorter, and reducing a laser spot used to record data by increasing the numerical aperture (NA) of an objective lens used with a pickup. Presently, research and development of two-dimensional memories with violet laser as a light source are being actively conducted.

However, since there are no suitable optical materials in ultraviolet areas and no suitable optical materials used for recording media and lens, it is conceivable that violet laser has the shortest possible recording laser wavelength, which cannot be shorter. A proposed method of increasing NA is that a solid immersion lens (SIL) to reduce a focusing spot by using a hemispheric prism having a high refractive index is used to increase the numerical aperture. This method utilizes evanescent light formed on a prism bottom to form a minute focusing spot. Since the evanescent light is non-propagative light existing locally in the vicinity of a prism bottom and exists only within an area of up to a wavelength from the emission end of SIL, a recording medium must be placed in the immediate vicinity of the prism bottom for recording and retrieval. Therefore, there are many problems to be solved, such as control of the distance between a recording medium and the prism, and the establishment of portability of recording media. The refractive index of prism materials is not more than 2 and recording density is also not increased beyond about four times.

For these reasons, current two-dimensional optical memories reach a limit in terms of recording density. High-density recording of 50 GB or more requires that information be recorded three-dimensionally, including the depth direction of a recording medium (volumetric recording).

Holographic memories recording information in the form of hologram are three-dimensional optical memories that are capable of large-capacity recording. The holographic memories are page-oriented memories that have the high-speed data transfer rate. For this reason, the holographic memories are in the limelight as recording media of the next generation.

Holography is a technique for recording information of the amplitude (intensity) and phase of light in a medium and retrieving it. Coherent light such as laser light is applied to an object, and reflected light (object light) from the object is irradiated onto a recording medium along with another piece of coherent light (reference light), whereby an interference pattern is formed on the recording medium. A light intensity distribution produced by the interference is recorded in a medium as changes of refractive indexes and/or absorption coefficients, and a thing produced in the medium is referred to as a hologram. If reference light only is incident on the recording medium in which the hologram is recorded, the hologram functions as diffracted gratings, so that object light is retrieved.

In the holographic memories, digital data (binary data of 0 or 1) is converted to on/off (bright/dark) patterns using an spatial light modulator and incident on a recording medium as object light, whereby the digital data can be recorded as a hologram. Reference light is applied to a recording medium to reproduce object light and the reproduced object light is received by a photodetector for photoelectric conversion, whereby original binary data can be retrieved from the obtained electric signals. Recently, research into the digital holographic memories is in progress from the engineering point of view, as found in S/N and bit error rate evaluation based on a specific optical system of the digital holographic memories and a volumetric multiple recording method, proposal of two-dimensional encoding, and a study of influence of aberration of an optical system.

As holographic recording materials, attention is being given to polymer materials that are inexpensive and can be easily formed to disk shape. Vigorous research is being done on so-called photopolymers for use as ROM media, and for use as erasable media, photosensitive polymers containing photoisomerizable groups such as azo groups are promising.

To achieve a large capacity by holographic memories requires that the thickness of a recording layer in which holograms are recorded be increased and plural hologram be recorded within an identical volume. For example, to store 100 GB or more of digital data on one disk, the thickness of a recording layer must be 1 mm or more. However, making the recording layer thick while maintaining optical quality is very difficult and expensive in the present situation.

A method of achieving a large capacity by solving this problem is described in Japanese Published Unexamined Patent Application No. Hei 9-101735. In Japanese Published Unexamined Patent Application No. Hei 9-101735, a recording and/or retrieval method is described which uses an optical recording medium of multilayered optical waveguide type. This optical recording medium has plural optical waveguide layers and recording layers stacked on a substrate through clad layers so that optical waveguide layers sandwiched by adjacent clad layers constitute optical waveguides. This optical recording medium is used to record a hologram by selectively introducing a reference light into an optical waveguide from an end face of an optical waveguide layer, irradiating object light (signal light) from an interface of the optical waveguide layer, and causing evanescent light leaking to a recording layer and the object light to interfere with each other. In this case, the thickness of the recording layer required to record one hologram can be as thin as several micrometers and the film of the recording layer can be produced without impairing optical quality by the spin coating and casting method. Stacking two or more of such thin recording layers enables multiple holographic recording.

However, a recording and/or retrieval method using an optical recording medium of multilayered optical waveguide type as described in Japanese Published Unexamined Patent Application No. Hei 9-101735 has the following problems. In the optical recording medium, a hologram is recorded by guiding reference light used in the recording through a waveguide layer, and causing evanescent light leaking to a recording layer and object light to interfere with each other. However, since the evanescent light reaches a recording layer only as far as wavelength order, a hologram cannot be recorded with sufficient depth in the direction of medium thickness. Also, the evanescent light is too weak to provide sufficient exposure intensity. As a result, the recorded hologram provides no satisfactory diffraction efficiency. Also, during retrieval, it is difficult to apply a reading light of sufficient intensity.

To solve these problems, it is desirable that a hologram is recorded by guiding reference light and reading light through a recording layer and causing reference light guided through a recording layer instead of evanescent light and object light to interfere with each other, and the hologram is retrieved by reading light guided through the recording layer. However, the recording layer is made of a photosensitive material in which the reference light and reading light are absorbed to record holograms. Therefore, if the reference light were introducing into the recording layer from an end face thereof and guided through it, a hologram could not be recorded because of large optical loss. Also, guiding reading light during retrieval would destroy a recorded hologram.

SUMMARY OF THE INVENTION

The present invention has been made in view of the above circumferences and provides an optical recording medium that can record holograms with sufficient diffraction efficiency and has a recording layer through which reading light inputted from an end face thereof can be guided.

The present invention also provides a holographic recording and/or retrieval method and a holographic recording and/or retrieval apparatus that can record holograms with sufficient diffraction efficiency and can read recorded holograms without destroying them by guiding reading light inputted to a recording layer from an end face thereof.

An optical recording medium of the present invention includes: a substrate; and a recording layer, formed on a surface of the substrate, through which light having an incident angle of a predetermined value or more with respect to the surface is guided, and which changes a refractive index or absorption coefficient upon simultaneous irradiation of signal light of a predetermined wavelength and reference light, and can record holograms by holding the changed refractive index or absorption coefficient.

The optical recording medium of the present invention is formed on the surface of a substrate with a recording layer which changes a refractive index or absorption coefficient when signal light of a predetermined wavelength and reference light are simultaneously applied, and can record holograms by holding the changed refractive index or absorption coefficient. Since light having an incident angle of a predetermined value or more with respect to the substrate surface is guided, reading light can be guided during retrieval, and a hologram can be retrieved by diffracted light produced when the reading light is guided through the recording layer.

In the above-described optical recording medium, the refractive index of the recording layer is made higher than a refractive index of the substrate, whereby the recording layer serves as a slab optical waveguide through which light inputted at an incident angle of a predetermined value or more to the recording layer can be guided. A clad layer having a lower refractive index than the recording layer can be further formed on the recording layer. Further, plural sets of the recording layers and the clad layers can be stacked to create a multilayered optical recording medium having plural recording layers.

Materials exhibiting photoinduced birefringence (also referred to as photoinduced dichromatism or photoinduced anisotropy) are sensitive to a polarization state of light irradiated on them and can record a polarization direction of incident light. A polymer or a polymeric liquid crystal having photoisomerizable groups in the side chain has excellent recording properties. Therefore, desired optical recording media are those that are provided with a recording layer made of a polymer or a polymeric liquid crystal having photoinduced birefringence and having photoisomerizable groups in a side chain. The photoisomerizable groups are preferably those containing azobenzene structures, and the polymer or polymeric liquid crystal preferably consists of a sort of monomer selected from a polyester group.

A holographic recording and/or retrieval method of the present invention, which records holograms in an optical recording medium of the present invention and retrieves recorded holograms, includes the steps of: during recording, recording a hologram by simultaneously irradiating the recording layer with signal light of predetermined wavelength and reference light; and during retrieval, guiding reading light of wavelength that does not change a refractive index or absorption coefficient held in the recording layer through the recording layer, and retrieving a hologram by diffracted light produced when the reading light is guided through the recording layer.

A holographic recording and/or retrieval apparatus of the present invention, which records holograms in the optical recording medium of the present invention and retrieves recorded holograms, includes: a signal light irradiating unit that irradiates a predetermined area of the recording layer with signal light of a predetermined wavelength from a direction crossing with a guide direction of the recording layer; a reference light irradiating unit that irradiates the predetermined area with reference light of predetermined wavelength so as to change the refractive index or absorption coefficient of the recording layer by interference with the signal light; and a reading light inputting unit that inputs reading light of wavelength that does not change a refractive index or absorption coefficient held in the recording layer so as to guide it through the recording layer.

In the holographic recording and/or retrieval method and the holographic recording and/or retrieval apparatus of the present invention, during recording, a hologram is recorded by simultaneously irradiating the recording layer with signal light of predetermined wavelength and reference light while, during retrieval, reading light of wavelength that does not change a refractive index or absorption coefficient held in the recording layer is guided through the recording layer, and a hologram is retrieved by diffracted light produced when the reading light is guided through the recording layer. With this construction, the problem of guide loss does not occur during recording, and during retrieval, a recorded hologram can be retrieved without being destroyed.

By applying the above-described holographic recording and/or retrieval method, signal light holding data information by a polarization distribution is applied to the optical recording medium along with reference light, the polarization distribution of the signal light is recorded as a hologram, and the recorded hologram can be retrieved by diffracted light produced when reading light is guided through the recording layer. Since the polarization hologram produces, as diffracted light, light in which polarization directions of signal light are preserved, for example, by turning polarization angles of the signal light by a predetermined angle at a time according to the data information to create a polarization distribution, information recording based on differences of polarization angles can be performed.

By applying the above-described holographic recording and/or retrieval method, signal light holding first data information by an intensity distribution is applied to a predetermined area of the optical recording medium along with reference light, an intensity distribution of the signal light is recorded as a first hologram, a polarization state of one of the signal light and the reference light is changed to irradiate the predetermined area of the optical recording medium along with the reference light with signal light holding second data information by an intensity distribution, the intensity distribution of the signal light is recorded in multiplexed form as a second hologram, and the first hologram and the second hologram can be retrieved by diffracted light produced when reading light is guided through the recording layer.

Reading light is applied to the identical area of the optical recording medium recorded by the two pieces of signal light having different polarization directions along with identical reference light to obtain diffracted light in which two diffracted light components having polarization directions orthogonal to each other are synthesized, and a specified polarization component is taken out from the diffracted light, whereby computation output between two pieces of data recorded as two pieces of signal light in the area can be obtained. That is, any computations such as addition, subtraction, and logical operations can be performed simply and rapidly.

BRIEF DESCRIPTION OF THE DRAWINGS

Preferred embodiments of the present invention will be described in detail based on the followings, wherein.

DESCRIPTION OF THE PREFERRED EMBODIMENTS

Hereinafter, embodiments of the present invention will be described with reference to the accompanying drawings.

(Holographic Optical Recording Medium)

First, an optical recording medium of the present invention will be described.

Figure 1A:
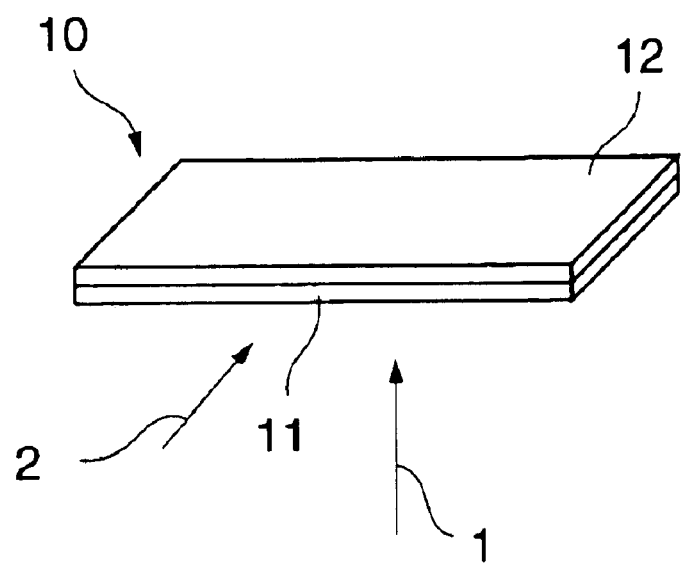
FIG. 1A is a perspective view showing a configuration of an optical recording medium of the present invention, and FIG. 1B a perspective view showing another configuration of an optical recording medium of the present invention.

As shown in FIG. 1A, an optical recording medium 10 includes a recording layer 12 formed to record a hologram on one surface of a transparent substrate 11 such as a glass substrate and a plastic substrate. In the wavelength of a laser beam applied as reading light during retrieval, the refractive index $n_1$ of the recording layer 12 is higher than the refractive index $n_2$ of the transparent substrate 11, and the recording layer 12 functions as a slab optical waveguide. The refractive index $n_1$ of the recording layer 12 is higher than the refractive index of air layer. Signal light (object light) 1 during recording and reference light 2 are applied from the transparent substrate 11 side as shown in the drawing.

Figure 1B:
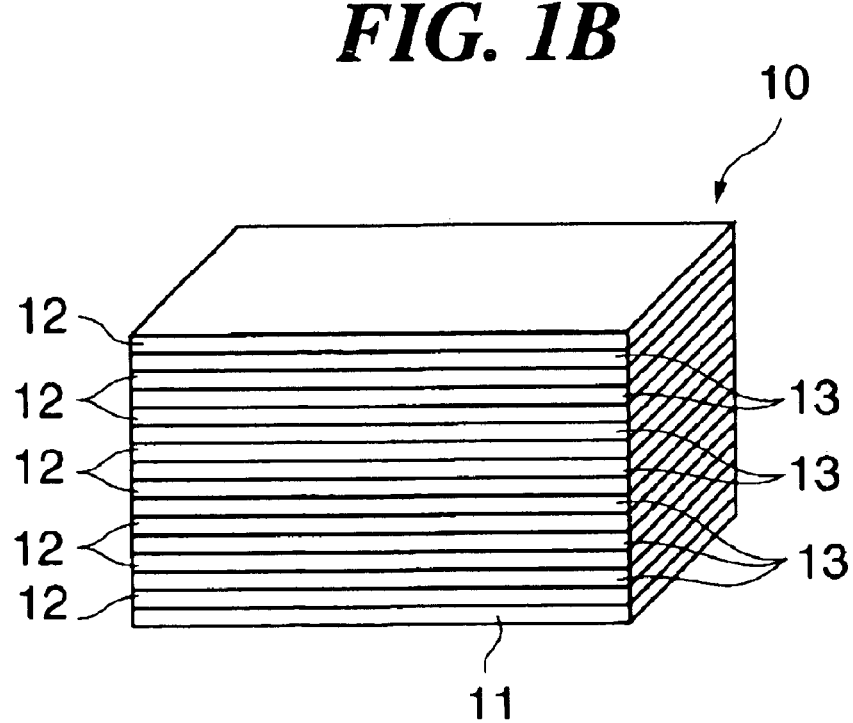

As shown in FIG. 1B, plural sets of recording layers 12 and clad layers 13 may be alternately stacked to form plural slab waveguides so that an optical recording medium of multilayered optical waveguide type is produced. The refractive index of the clad layer 13 is $n_2$, which is the same as the refractive index of the transparent substrate 11.

In either case of FIGS. 1A and 1B, the optical recording medium 10 is formed in sheet shape as a whole, that is, so as to have a sufficient spread in comparison with its thickness. The optical recording medium 10 is preferably formed into disk or card shape.

The recording layer 12 is capable of recording holograms by changes in refractive index or absorption coefficient. It may be made of any material that can hold changed refractive indexes or absorption coefficients in room temperatures. Suitable materials include photosensitive materials exhibiting photoinduced birefringence. Materials exhibiting photoinduced birefringence respond to a polarization state of incident light and can record polarization directions of incident light. Optical recording media that can record holograms by photoinduced birefringence corresponding to a polarization distribution are referred to as optical recording media.

A material exhibiting photoinduced birefringence is preferably a polymer or a polymeric liquid crystal having photoisomerizable groups in a side chain, or a polymer in which photoisomerizable molecules are dispersed. Photoisomerizable groups or molecules are preferably, e.g., those containing azobenzene structure.

The principle of photoinduced birefringence will be described using azobenzene as an example. Azobenzene exhibits cis-trans photoisomerization by light irradiation as shown in a chemical formula below. The optical recording layer, before being subjected to light irradiation, is abundant in trans-azobenzene. These molecules are oriented at random and macroscopically isotropic. When linear polarized light is applied to the optical recording layer from a specified direction indicated by the arrow, a trans-1 material having an absorption axis in the same direction as its polarization direction is selectively photoisomerized to a cis-material. Molecules modified to a trans-2 material having an absorption axis orthogonal to the polarization direction no longer absorb light and are fixed to its state. As a result, anisotropy of absorption coefficients and refractive indexes, that is, dichroism and birefringence are macroscopically induced. Generally, these properties are called photoinduced birefringence, photoinduced dichroism, or photoinduced anisotropy. By applying circularly polarized light or non-polarized light, the induced anisotropies can be erased.

[Chemical formula 1]

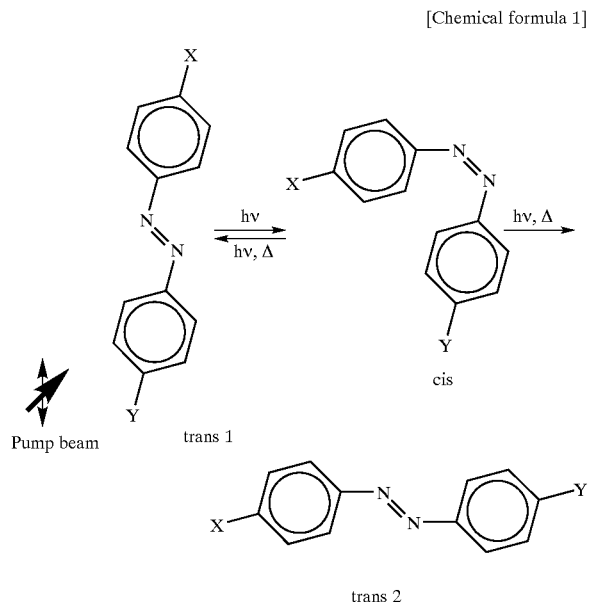

Such polymers containing photoisomerizable group can, as a result of photoisomerization, change in the direction of polymers themselves and induce large birefringence. Birefringence thus induced is stable below a glass transition temperature of polymers, and is suitable to record holograms.

An example of a preferable material of which the recording layer 12 is made is polyester having cyanobenzene units in the side chains represented by a chemical formula below. The polyester can record the strength and polarization direction of signal light as holograms due to photoinduced anisotropy caused by photoisomerization of the cyanobenzene units in the side chains. ("Holographic recording and retrieval of polarized light by use of polyester containing cyanoazobenzene units in the side chain", K. Kawano, T. Ishii, J. Minabe, T. Niitsu, Y. Nishikata and K. Baba, Opt. Lett. Vol. 24 (1999) pp. 1269–1271.)

[Chemical formula 2]

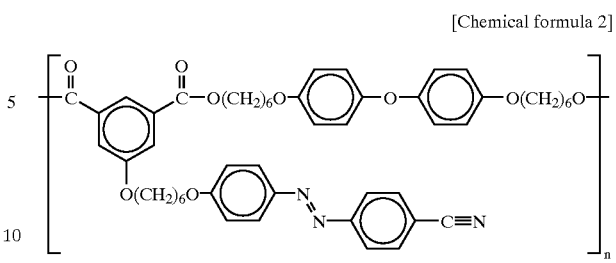

The optical recording medium 10 having the recording layer 12 made of the above-described polyester material can be fabricated by casting a polyester chloroform solution onto a cleaned glass substrate and drying it. As a result of the measurement of an absorption spectrum of the optical recording medium 10 in which the recording layer 12 having a film thickness of 20 $\mu$m was formed, a spectrum was obtained which has a peak in the vicinity of 365 nm, which corresponds to $\pi$–$\pi$* transition of azobenzene.

A method of fabricating an optical recording medium is not limited to the above-described method; the optical recording medium may be fabricated by spin-coating a material of the recording layer on the substrate, or by implanting the material of the recording layer to parallel flat plate cells. Also, the optical recording medium may be fabricated by bonding the material of the recording layer to a filmy substrate by hot press.

(Principle of Polarization Holographic Recording)

Where holograms are recorded in the optical recording medium 10 having the recording layer 12 made of a polymer or a polymeric liquid crystal having the azobenzene in the side chain, or a polymer in which the azobenzene is dispersed, coherent signal light 1 and reference light 2 are applied at the same time to identical areas of the optical recording layer 10.

Figure 2A:
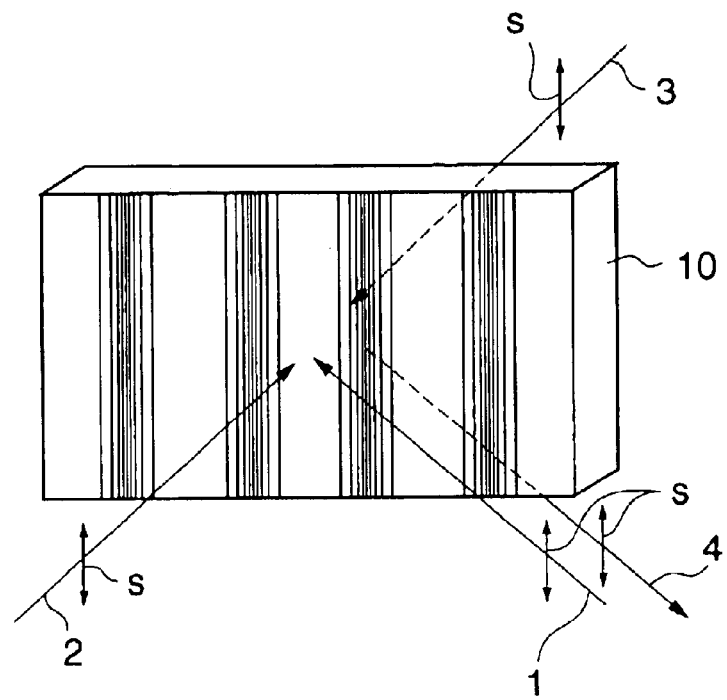
FIGS. 2A and 2B illustrate a hologram based on a light intensity distribution and a hologram based on a polarization distribution.

In this case, when the polarization directions of the signal light 1 and the reference light 2 are parallel with each other, for example, when both the signal light 1 and the reference light 2 are s-polarized light as shown in FIG. 2A, a light intensity distribution occurs due to the interference of the two optical waves within the optical recording medium 10. In places where light intensity is high, optical anisotropy is induced by a cis-trans-cis-trans isomerization cycle as described above. Consequently, gratings of absorption coefficients or refractive indexes corresponding to a light intensity distribution are recorded as holograms.

Figure 2B:
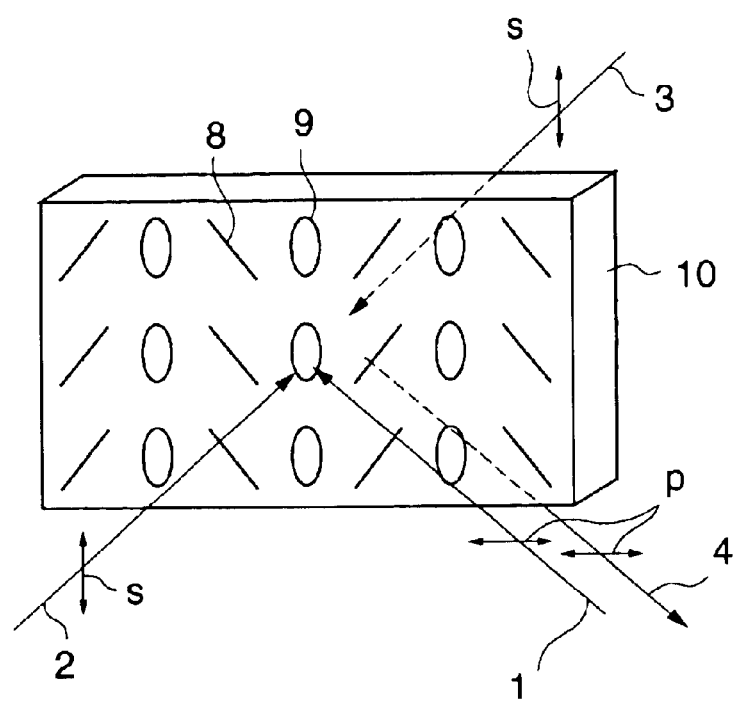

On the other hand, when the polarization directions of the signal light 1 and the reference light 2 are orthogonal to each other, for example, when the signal light 1 is p-polarized light and the reference light 2 is s-polarized light as shown in FIG. 2B, a light intensity distribution caused by the interference do not occur. Instead, polarization directions are spatially and cyclically modulated so that linear polarized light portions 8 and elliptically polarized light portions 9 appear alternately and cyclically.

In this case, although a light intensity distribution is uniform, the optical anisotropy of azobenzene aligned in directions identical with modulated polarization directions is induced by a trans-cis-trans isomerization cycle as described previously, with the result that holograms are recorded.

Hereinafter, holograms produced by a light intensity distribution when the polarization directions of the signal light 1 and the reference light 2 are parallel with each other as shown in FIG. 2A will be referred to as light intensity holograms, and holograms produced by a polarization distribution when the polarization directions of the signal light 1 and the reference light 2 are orthogonal to each other as shown in FIG. 2B will be referred to as polarization holograms.

According to the optical recording medium 10 having the recording layer 12 made of a polymer or a polymeric liquid crystal having azobenzene units in the side chain, or a polymer in which azobenzene is dispersed, whether the polarization directions of the signal light 1 and the reference light 2 are parallel with or orthogonal to each other, the anisotropy of azobenzene is induced, with the result that holograms are recorded.

In each of the above-described cases, if the polarization direction of hologram reading light 3 is the same as the polarization direction of the reference light 2, diffracted light 4 having the same polarization state as the signal light 1 can be obtained. Recorded holograms are kept without modification over several years under room temperatures and natural light.

(Holographic Recording and/or Retrieval Apparatus)

Figure 3A:
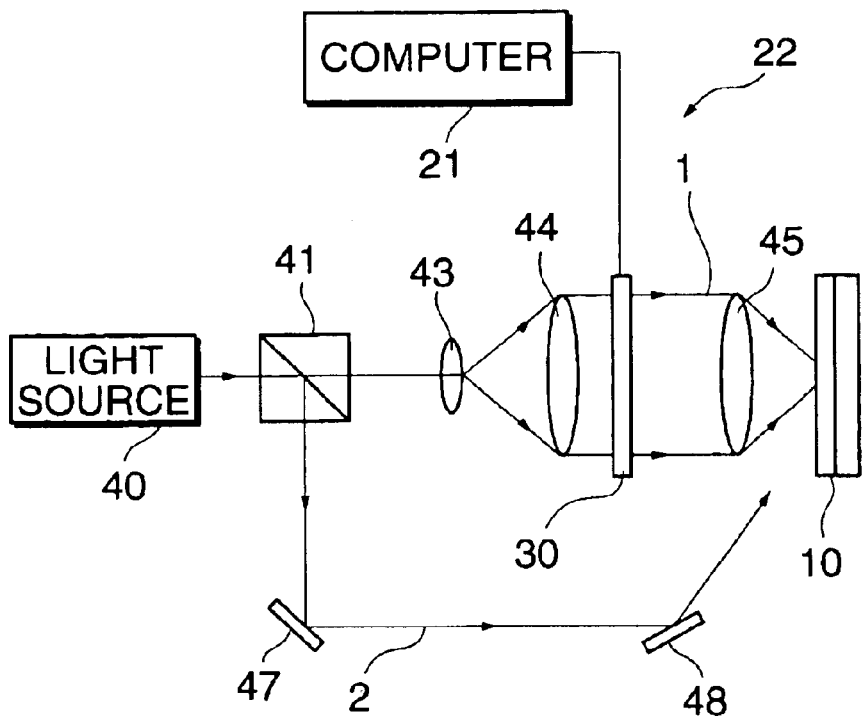
FIGS. 3A and 3B are section views showing configurations of a holographic recording and/or retrieval apparatus of the present invention.
Figure 3B:
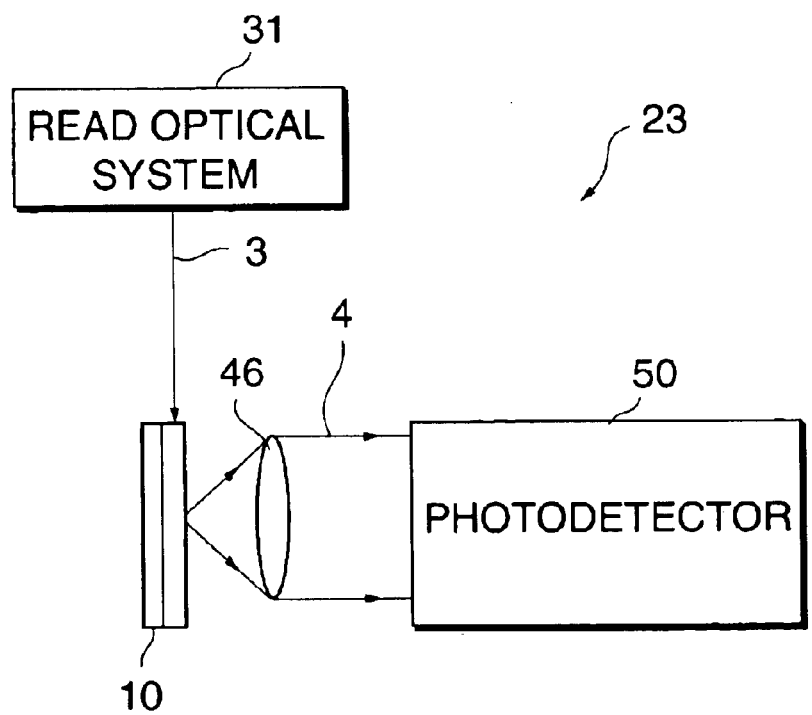

FIG. 3 shows an example of a holographic recording and/or retrieval apparatus of the present invention. The holographic recording and/or retrieval apparatus includes a recording apparatus shown in FIG. 3A and a retrieval apparatus shown in FIG. 3B.

The recording apparatus, as shown in FIG. 3A, includes a recording head 22 that records holograms by irradiating a specified area of the optical recording medium 10 with signal light 1 and reference light 2 at the same time. The recording head 22 includes: a light source 40 emitting coherent light; a beam splitter 41 for splitting light from the light source 40 to the two optical waves of signal light and reference light; lenses 43 and 44 for parallelizing optical waves passing through the beam splitter 41; a spatial light modulator 30 for modulating parallelized optical waves; a focusing lens 45 for focusing the modulated signal light 1 into a specified area of the optical recording medium 10; and mirrors 47 and 48 for guiding optical waves reflected in the beam splitter 41 to a specified area of the optical recording medium 10 as reference light 2. The spatial light modulator 30 is connected to a computer 21 and controlled by it.

As a light source 40 of the recording head 22, one that is sensitive to a material of the recording layer 12 and emits coherent light can be used. Where polyester having cyanoazobenzene units in the side chain is used for the recording layer 12, an argon ion laser having an oscillation wavelength of 515 nm corresponding to the tail of an absorption peak of the optical recording medium 10 is preferably used as a light source.

As the spatial light modulator 30, a pass-through-type spatial light modulator can be used in which transparent electrodes are formed on both surfaces of an electrooptical conversion material such as liquid crystal. This type of spatial light modulator is generally used for for a projector.

Figure 4:
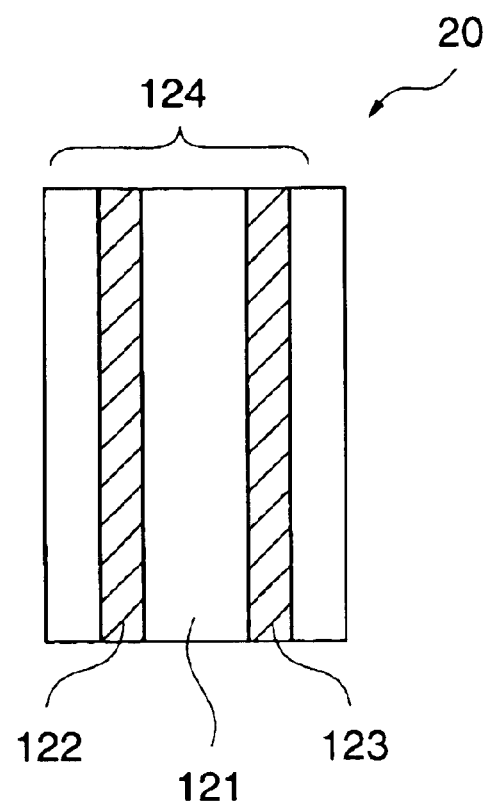
FIG. 4 is a section view showing a configuration of a spatial light modulator used in the holographic recording and/or retrieval apparatus of the present invention.

To enable polarization modulation, where the above-described liquid crystal panel for a projector is used, at least a polarization plate placed at an output side must be removed. For example, the spatial light modulator 30 can, as shown in FIG. 4, be constituted as a translucent liquid crystal cell 124 in which electrodes 122 and 123 are formed on both surfaces of a liquid crystal 121, which serves as an electrooptical conversion material. The spatial light modulator 30 to perform the polarization modulation has plural pixels two-dimensionally formed with each pixel functioning as a half-wave plate and modulates the polarization state of each pixel corresponding to data. The retrieval apparatus, as shown in FIG. 3B, includes a reading optical system 31 for introducing coherent light from an end face of the optical recording medium 10, and a read part 23 for reading diffracted light 4 by a recorded hologram. The read part 23 includes a lens 46 for parallelizing the diffracted light 4 and a photodetector 50 such as CCD for detecting incident diffracted light.

The reading optical system 31 may be configured to include a light source that emits coherent light without changing refractive indexes or absorption coefficients held by a hologram recorded in the recording layer 12 of the optical recording medium 10 (namely, without destroying the recorded hologram). Where polyester having cyanobenzene units in the side chains is used for the recording layer 12, although a helium-neon laser having an oscillation wavelength of 633 nm that is insensitive (not absorbent) to the recording layer 12 of the optical recording medium 10 is preferably used as a light source, other laser diodes may also be used.

(Holographic Recording and/or Retrieval Method)

Next, a holographic recording and/or retrieval method of the present invention will be described.

During recording, in the recording apparatus shown in FIG. 3A, coherent light emitted from the light source 40 of the recording head 22 is split to the two optical waves of signal light and reference light by the beam splitter 41. An optical wave passing through the beam splitter 41 is made into parallel light of large diameter by the lenses 43 and 44. Thereafter, the parallelized optical wave is modulated into signal light 1 by the spatial light modulator 30.

The modulated signal light 1 is focused or Fourier-transformed by the lens 45 and applied to a specified area of the optical recording medium 10. On the other hand, a reference light 2 reflected by the beam splitter 41 is reflected by the mirrors 47 and 48, is guided to a specified area of the optical recording medium 10, and is inputted to the optical recording medium 10 so as to cross with the signal light 1 in the optical recording medium 10. By thus irradiating identical areas with the signal light 1 and the reference light 2 at the same time, a hologram is recorded.

As described above, laser light of wavelength that is sensitive to the material of the recording layer 12 of the optical recording medium 10 is used as the signal light 1 and the reference light 2. An incident angle of the signal light 1 and the reference light 2 can be obtained as described below.

Figure 6A:
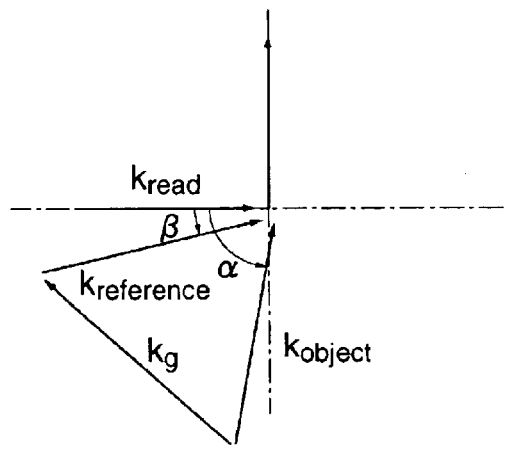
FIG. 6 is a diagram showing a relationship between a wave vector of signal light, a wave vector of reference light, a wave vector of reading light, and a grating vector formed.
Figure 6B:
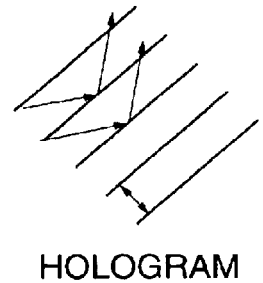

As shown in FIG. 6, assuming the wave vectors of the signal light 1 and the reference light 2 during recording are $k_{object}$ and $k_{reference}$, respectively, and the wave vector of reading light 3 is $k_{read}$, then $k_{object}$ and $k_{reference}$ have angles of $\alpha$ and $\beta$, respectively, with respect to the vector direction of reading light 3, and the crossing angle of the two optical waves is $\alpha-\beta$. A grating vector formed by $k_{object}$ and $k_{reference}$ is given by $k_g = k_{object} - k_{reference}$, and a grating period $\Lambda$ of a recorded hologram is given by a formula 1 below.

$$\Lambda = \frac{\lambda}{2\sin\left(\frac{\alpha - \beta}{2}\right)} \qquad \text{Formula 1}$$

Consider the case where the wavelength of the signal light and the reference light used in the recording is $\lambda$ and reading light (wave vector $k_{read}$) of wavelength $\lambda'$ is incident at an angle of 0 with respect to the substrate surface. An incident angle to a grating is $(\alpha+\beta)/2$, and intensive diffracted light is obtained when phase matching conditions of a formula 2 below are satisfied.

$$\sin\left(\frac{\alpha+\beta}{2}\right) = m\frac{\lambda'}{2\Lambda} \quad (m = 1, 2, 3, \dots) \qquad \text{Formula 2}$$

Since the formula 2 gives the condition in which reflected light beams from different layers by multiple reflection have an identical phase, a relation of a formula 3 is derived from the formulas 1 and 2.

$$m\frac{\lambda'}{\lambda} = \frac{\sin\left(\frac{\alpha+\beta}{2}\right)}{\sin\left(\frac{\alpha-\beta}{2}\right)} \qquad \text{Formula 3}$$

For satisfying the formula 3, when reading light is guided through a waveguide, the phase matching condition of hologram is satisfied and diffracted light can be obtained. The diffracted light is generated perpendicular to the waveguide in the condition that an incident angle to gratings is $(\alpha+\beta)/2=45°$. If this condition is assigned to the formula 3, $\alpha$ and $\beta$ represented by formulas 4 and 5 are respectively obtained. That is, an incident angle $\alpha$ of signal light and an incident angle $\beta$ of reference light can be calculated according to the values of the wavelength $\lambda$ of the signal light and the reference light and the wavelength $\lambda'$ of the reading light.

$$\beta = 45 - \sin^{-1}\left(\frac{\sqrt{2}}{2m}\frac{\lambda}{\lambda'}\right) \qquad \text{Formula 4}$$

$$\alpha = 45 + \sin^{-1}\left(\frac{\sqrt{2}}{2m}\frac{\lambda}{\lambda'}\right) \qquad \text{Formula 5}$$

For example, letting $\lambda=515$ nm, $\lambda'=633$ nm, and m=1, an incident angle $\alpha$ of signal light and an incident angle $\beta$ of reference light can be calculated as 80° and 10°, respectively.

Figure 8:
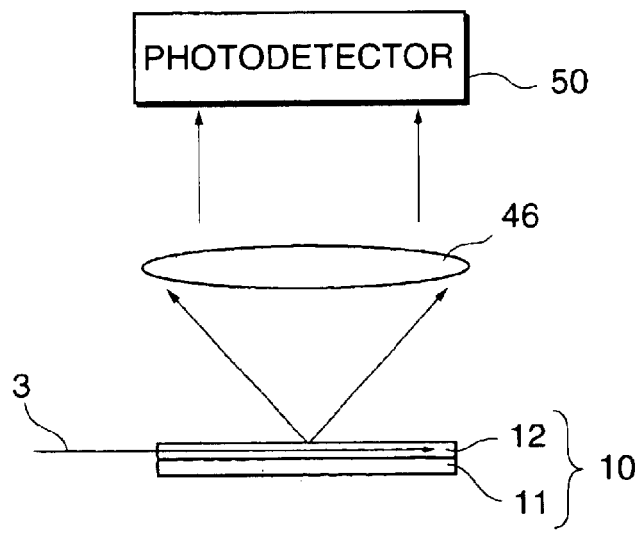
FIG. 8 is a section view showing how diffracted light is read by a holographic recording and/or retrieval method of the present invention.

Next, during reading, in the retrieval apparatus shown in FIG. 3B, coherent light emitted from the reading optical system 31 is inputted as reading light 3 through an end face of the recording layer 12 of the optical recording medium 10. As shown in FIG. 8, inputted reading light 3 is guided through the recording layer 12 and diffracted light is diffracted from the recording layer 12. The diffracted optical waves (diffracted light 4) form an image in a photodetector 50 by the lens 46.

As described above, during retrieval, the reading light 3 whose wavelength does not change refractive indexes or absorption coefficients held by a hologram recorded in the recording layer 12 can be guided through the recording layer 12 to retrieve a recorded hologram without destroying it.

Since the reading light 3 is guided through the recording layer 12, a hologram recorded along a path of the reading light 3 can be read at a time.

Figure 5:
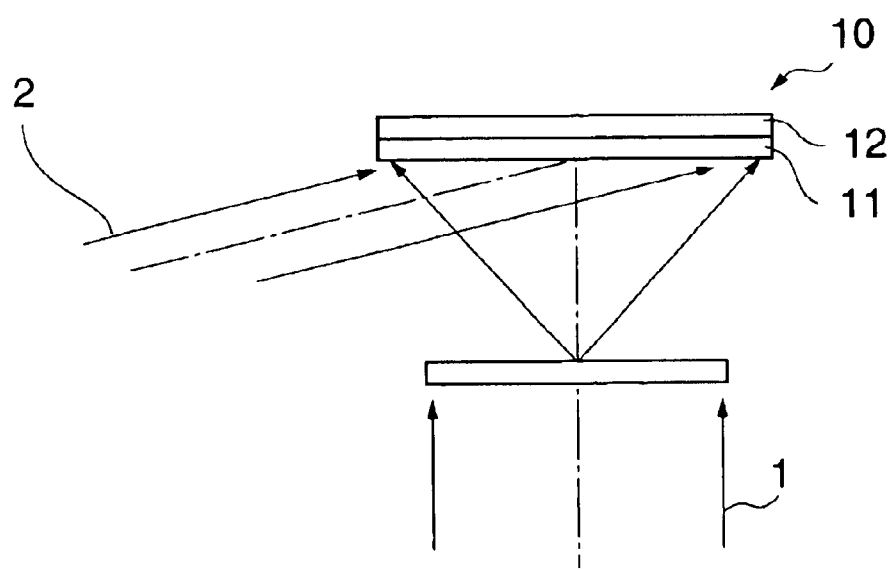
FIG. 5 is a section view showing another configuration of the holographic recording and/or retrieval apparatus of the present invention.
Figure 9:
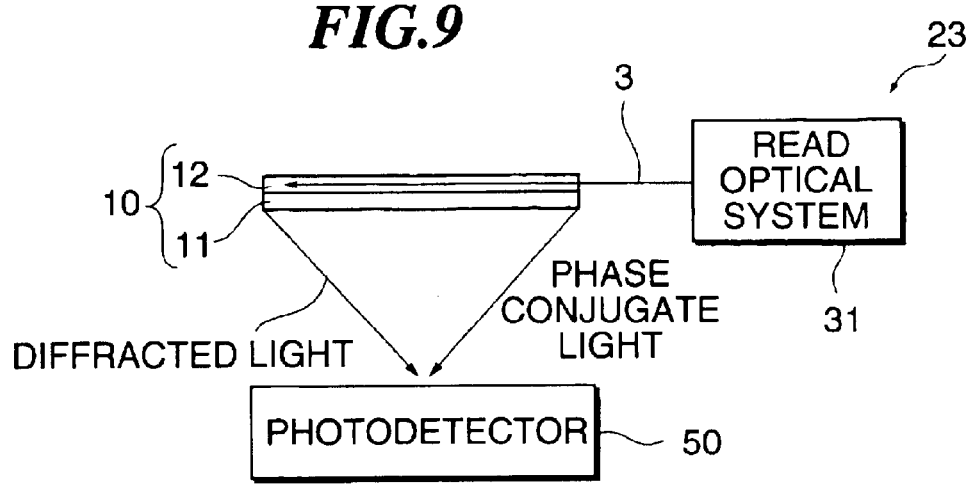
FIG. 9 is a section view showing how reading light is guided in the direction opposite to that in FIG. 8 to obtain phase conjugate light as diffracted light.

As shown in FIG. 5, where the signal light 1 modulated by the spatial light modulator 30 is irradiated onto the optical recording medium 10 without passing through a lens for holographic recording, the reading light 3 may also be guided through the recording layer 12 from a direction opposite to the incident direction of reference light used for the recording, as shown in FIG. 9. In this case, since the wavelength of the reference light is different from that of the reading light, the phase conjugate light of the signal light can be reproduced, although the magnification and light path change. The phase conjugate light has the same wave front as the signal light and propagates opposite to a light path through which the signal light is inputted. For this reason, an image can be formed in the photodetector 50 without using a special imaging optics.

Figure 7:
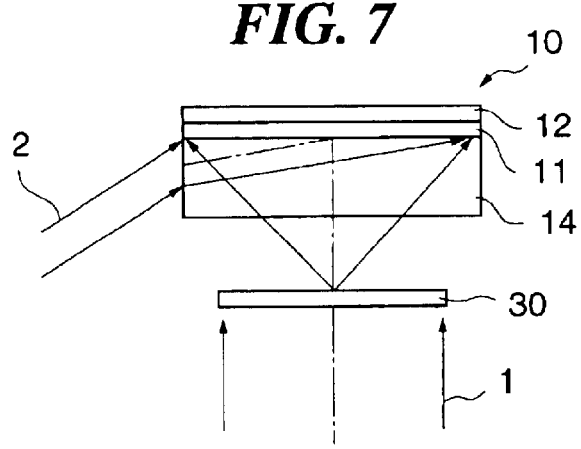
FIG. 7 is a section view showing a method of inputting reference light having a small incident angle.

To input the reference light 2 to the optical recording layer 12 at a narrow angle of, e.g., 10°, for example, as shown in FIG. 7, a thick glass substrate 14 having the same refractive index as the transparent substrate 11 is brought into contact with the transparent substrate 11 of the optical recording medium 10 and the reference light 2 is inputted from an side face of the glass substrate 14. The reference light 2 inputted from an side face of the glass substrate 14 is refracted on an interface between air and the glass substrate 14 and enters the optical recording layer 12 at a narrower angle than an angle at which it enters the glass substrate 14. Also, the transparent substrate 11 may be thick enough to enter the reference light 2 from a side of the transparent substrate 11.

(Polarization Holographic Recording)

A description will be made of an example of polarization holographic recording by use of the above-described holographic recording and/or retrieval method. The above-described polarization-sensitive optical recording medium having a recording layer made of polyester having cyanobenzene units in the side chains was used to perform recording and retrieval by the holographic recording and/or retrieval apparatus shown in FIGS. 3A and 3B.

Figure 10:
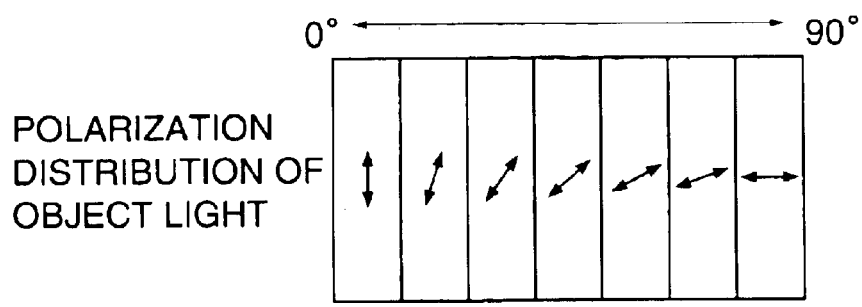
FIG. 10 is a drawing showing a polarization distribution of signal light when the holographic recording and/or retrieval method of the present invention applies to polarization holographic recording.

As a light source for recording, use was made of an argon ion laser having an oscillation wavelength of 515 nm that is sensitive to polyester, which is a material of the recording layer, and a crossing angle $\phi$ between signal light and reference light was 70°. The spatial light modulator 30 of polarization modulation type was used to create signal light having a polarization distribution shown in FIG. 10. In the signal light, the direction of linear polarization changes for each pixel, and the polarization directions represent data information. Herein, if directions of N values are recorded, data of $\log_2 N$ bits can be represented for each pixel.

Figure 11A:
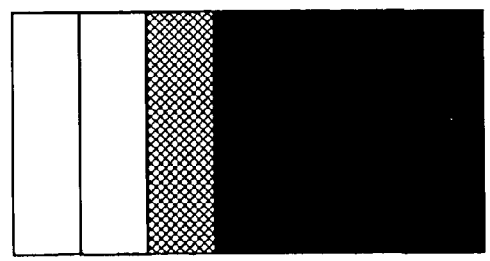
FIG. 11A shows an image of 0° polarization components of diffracted light obtained based on a polarization hologram in which signal light is recorded as shown in FIG. 10.
Figure 11B:
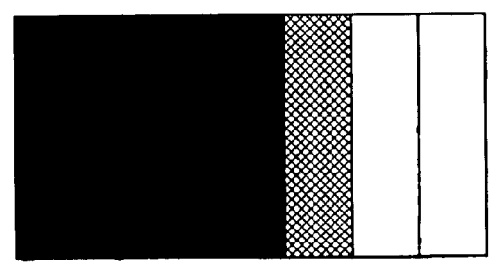
FIG. 11B shows an image of 90° polarization components.

As a light source of the reading optical system 30, use was made of a helium-neon laser having an oscillation wavelength of 633 nm that is insensitive to polyester, which is a material of the recording layer. A reading light was guided through the recording layer from a direction opposite to the incident direction of reference light used for the recording so that phase conjugate light of the signal light was diffracted. An analyzer was placed in the path of the diffracted light to separate it into orthogonal polarization components (0° polarization component and 90° polarization component). As a result, two images of 0° polarization component and 90° polarization component as shown in FIGS. 11A and 11B were obtained. A polarization angle $\rho$ of retrieval light was calculated using a formula 6 below from a light intensity distribution ratio between the two images.

$$\rho = \tan^{-1}\left(\sqrt{\frac{I_{90}}{I_0}}\right) \qquad \text{Formula 6}$$

Figure 12:
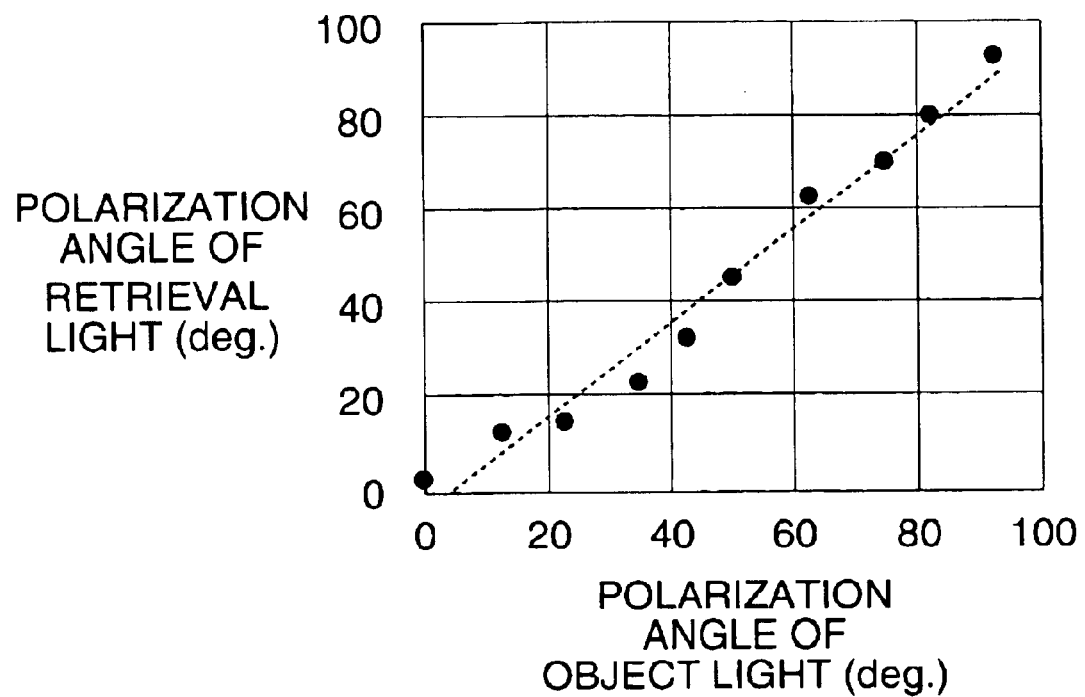
FIG. 12 is a drawing in which polarization angles of a retrieved image obtained based on a polarization hologram in which signal light is recorded as shown in FIG. 10 are plotted with respect to polarization angles of signal light.

$I_0$ and $I_{90}$ are respectively the intensities of 0° polarization component and 90° polarization component of each pixel. The result of plotting polarization angles of the retrieved image with respect to polarization angles of signal light is shown in FIG. 12. FIG. 12 shows that polarization angles of the retrieved image change linearly with polarization angles of the signal light, indicating that polarization directions of the signal light and polarization directions of the retrieval light are the same. Therefore, according to the holographic recording and/or retrieval method of the present invention, a polarization distribution of signal light can be recorded, and a recorded polarization distribution can be correctly retrieved.

Although the foregoing description was made of an example of performing holographic recording and retrieval by use of signal light holding data information by a polarization distribution, the same holographic recording and retrieval can be performed using signal light holding data information by an amplitude (intensity) distribution and a phase distribution.

(Polarization Holographic Multiple Recording)

Next, a description will be made of using the above-described holographic recording and/or retrieval method to perform holographic recording in multiplexed form under the two conditions that the polarization directions of signal light and reference light are parallel with each other and orthogonal to each other, that is, an example of, at a first stage, performing holographic recording by parallelizing the polarization directions of signal light and reference light, and at a second stage, turning the polarization direction of signal light (or reference light) by 90° by a half-wave plate to make the polarization directions of signal light and reference light orthogonal to each other before recording a second hologram in an identical area in multiplexed form. The same polarization multiple recording and/or retrieval can also be performed using circularly polarized light orthogonal to each other.

Figure 13A:
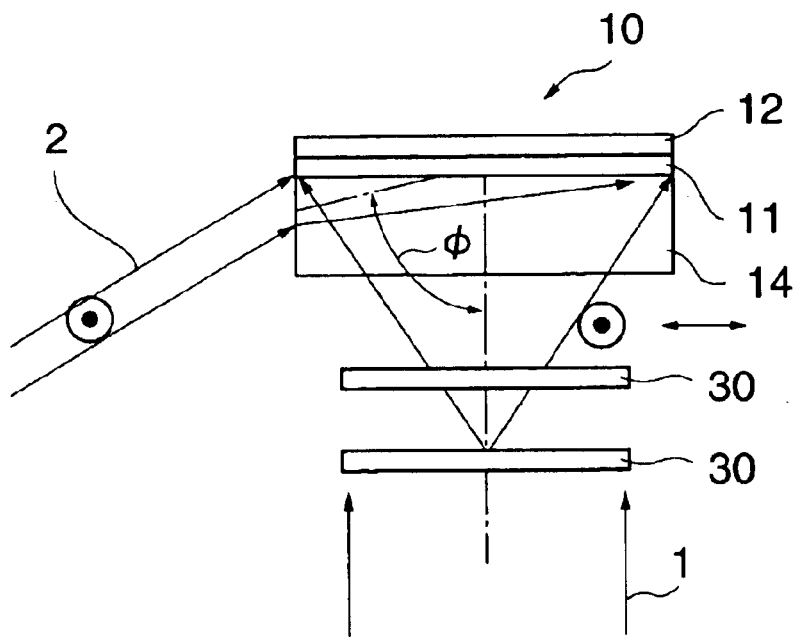
FIGS. 13A and 13B are section views showing other configurations of an optical recording apparatus of the present invention.
Figure 13B:
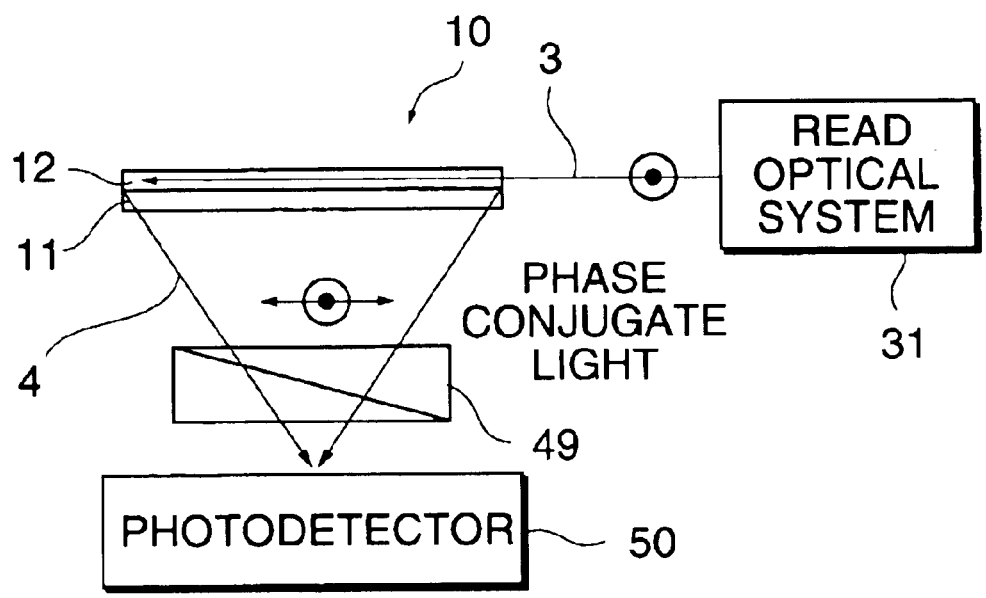

The above-described polarization-sensitive optical recording medium 10 having a recording layer 12 made of polyester having cyanobenzene units in the side chains was used to record and retrieve holograms in the same configuration as the recording apparatus shown in FIG. 5, except that a half-wave plate 20 was placed between the spatial light modulator 30 and the optical recording medium 10 as shown in FIG. 13A, and in the same configuration as the retrieval apparatus shown in FIG. 9, except that a polarizer 49 such as a polarization beam splitter for separating specified polarization components contained in diffracted light 4 was placed between the optical recording medium 10 and the photodetector 50, as shown in FIG. 13B.

As shown in FIG. 13A, as described later, an image is displayed in the spatial light modulator 30 by a computer not shown, signal light having information of the image displayed in the spatial light modulator 30 is obtained as light having passed through the spatial light modulator 30, and the signal light is made to pass through the half-wave plate 20 and is converted to signal light 1 having specified polarization directions. The signal light 1 having passed through the half-wave plate 20 is applied to the above-described optical recording medium 10. Thereby, the signal light 1 and the reference light 2 interfere with each other in the optical recording medium 10, with the result that a hologram is recorded in the optical recording medium 10.

Figure 14A:
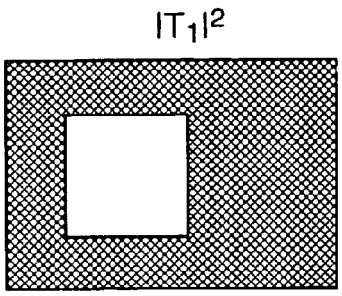
FIGS. 14A and 14B show input images in the case where the holographic recording and/or retrieval method of the present invention applies to polarization holographic multiple recording.

In this case, in a first stage, a first hologram is recorded in the optical recording medium 10 by displaying a binary intensity image as shown in FIG. 14A in the spatial light modulator 30, adjusting the half-wave plate 20 so that the polarization direction of signal light 1 passing through it is vertical (defined as 0°) to paper surface, and applying the signal light 1 and the reference light 2 onto the optical recording medium 10 at the same time.

Figure 14B:
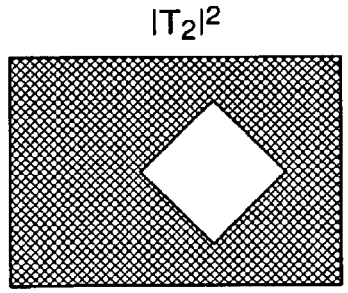

Next, in a second stage, a second hologram is recorded in the area in which the first hologram is recorded in the optical recording medium 10, by displaying a binary intensity image as shown in FIG. 14B in the spatial light modulator 30, adjusting the half-wave plate 20 so that the polarization direction of signal light 1 passing through it is parallel (defined as 90°) to paper surface, and irradiating the optical recording medium 10 with the signal light 1 and the reference light 2 at the same time. The polarization direction of the reference light 2 must be identical between that during recording of the first hologram and that during recording of the second hologram.

During reading, as shown in FIG. 13B, coherent light outputted from the reading optical system 31 is inputted as reading light 3 from an end face of the recording layer 12 of the optical recording medium 10. The inputted reading light 3 is guided through the recording layer 12 and the second-order-diffracted light is diffracted from the recording layer 12.

The diffracted light 4 is imaged onto the photodetector 50 such as CCD to read a data image of the signal light 1. That is, a retrieved image can be obtained from the two holograms recorded in the first and second stages. Diffracted light beams from the two holograms are orthogonal to each other in terms of polarization direction. In this case, the polarizer 49 is placed between the optical recording medium 10 and the photodetector 50, and the transmittance axis of the polarizer 49 is adjusted in an arbitrary direction by a computer not shown so that the two diffracted images can be read separately. For example, as described below, only the first or second image, or any computation output between the first and second images can be read.

Figure 15:
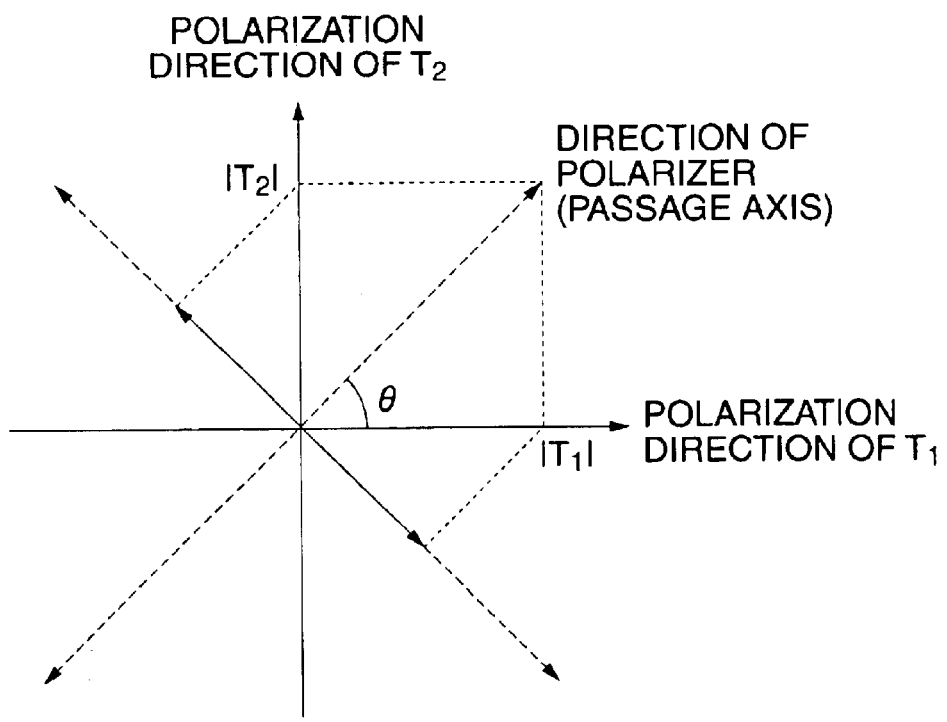
FIG. 15 is a drawing showing a relationship between the polarization direction of signal light, the polarization direction of diffracted light, and the direction of a polarizer in polarization holographic multiple recording.

As shown in FIG. 15, only the first image is read with the transmittance axis of the polarizer 49 as 0°, and only the second image is read with the transmittance axis of the polarizer 49 as 90°. Letting the amplitude of diffracted light component $A_1$ from the first hologram recorded in the first stage be $T_1$, and the amplitude of diffracted light component $A_2$ from the second hologram recorded in the second stage be $T_2$, when the transmittance axis of the polarizer 49 is 0°, the intensity of light passing through the polarizer 49 is proportional to $|T_1|^2$, and when the transmittance axis of the polarizer 49 is 90°, the intensity of light passing through the polarizer 49 is proportional to $|T_2|^2$.

This is the case where the polarization of the signal light 1 is correctly retrieved to the diffracted light 4. In reality, the polarization direction of the diffracted light 4 may somewhat differ from that of the signal light 1, depending on the polarization characteristics of the optical system and the optical recording medium 10. Even in that case, however, since the polarization directions of the two images having been subjected to multiple recording remain orthogonal to each other, by appropriately adjusting the transmittance axis of the polarizer 49, the two images can be taken out without any crosstalk.

Where a synthetic vector of the diffracted light component $A_1$ and the diffracted light component $A_2$ is parallelized with the polarizer, the intensity of light passing through the polarizer is proportional to $|T_1+T_2|^2$. If $|T_1|=|T_2|$, the sum of the two diffracted light components is obtained when θ=45°. That is, if the transmittance axis of the polarizer 49 is 45°, the intensity of light passing through the polarizer 49 is proportional to $|T_1+T_2|^2$, so that an addition output of the two images is obtained. Where a synthetic vector of the diffracted light component $A_1$ and the diffracted light component $A_2$ is orthogonal to the polarizer, the intensity of light passing through the polarizer is proportional to $|T_1-T_2|^2$. If $|T_1|=|$, the difference of the two diffracted light components is obtained when θ=135°. That is, if the transmittance axis of the polarizer 49 is 135°, the intensity of light passing through the polarizer 49 is proportional to $|T_1-R_2|^2$, so that a subtraction output of the two images is obtained.

Figure 14C:
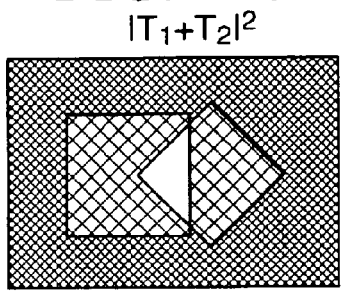
FIGS. 14C and 14D show output images obtained by processing the input images shown in FIGS. 14A and 14B.
Figure 14D:
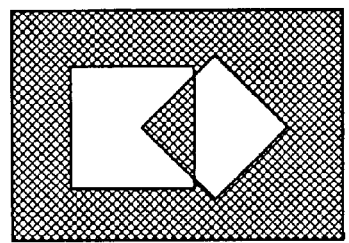

If the two images represented by amplitudes $T_1$ and $T_2$ are respectively binary images designated with "brightness" (data "1") and "darkness" (data "0") of light as shown in FIGS. 14A and 14B, subtraction output $|T_1-T_2|^2$ of the two images is also binary data, and is equivalent to exclusive OR (XOR) of the two images as shown in FIG. 14C. On the other hand, although addition output $|T_1+T_2|^2$ of the two images has three values (brightness) of "1+1", "1", and "0", if "1+1" and "1" are defined as "brightness" and "0" as "darkness" by threshold processing, logical OR of the two images is obtained as shown in FIG. 14D.

As has been described above, an optical recording medium of the present invention has a photosensitive recording layer exhibiting photoinduced birefringence formed on one surface of a transparent substrate, wherein, in the wavelength of a laser beam applied as reading light during retrieval, since the refractive index $n_2$ of the transparent substrate is lower than the refractive index $n$, of the recording layer 12, the recording layer functions as a slab optical waveguide so that reading light inputted from an end face can be guided through the recording layer.

In the holographic recording and/or retrieval method and holographic recording and/or retrieval apparatus of the present invention, during recording, laser light of wavelength that is sensitive to the recording layer of the optical recording medium is inputted, as reference light, to the recording layer at a narrow angle for recording. Therefore, guide loss presents no problem for holographic recording. During reading, laser light of wavelength that does not change refractive indexes or absorption coefficients held in the recording layer of the optical recording medium is guided through the recording layer as reading light to obtain diffracted light. Therefore, a recorded hologram can be retrieved without being destroyed.

The holographic recording and/or retrieval method of the present invention can be used to record and retrieve polarization of signal light in and from a polarization-sensitive optical recording medium as a polarization hologram. Since the polarization hologram produces, as its diffracted light, light in which polarization directions of signal light are preserved, by turning polarization angles of the signal light by a predetermined angle at a time, information recording and reading based on differences of polarization angles can be performed.

Further, by using the holographic recording and/or retrieval method of the present invention to define polarization directions of signal light and reference light in two ways so that they are parallel with and orthogonal to each other, two pieces of signal light can be recorded as two holograms in multiplexed form in an identical area of polarization sensitive optical recording medium. The reading light is applied to the area of the optical recording medium to obtain diffracted light in which two diffracted light components having polarization directions orthogonal to each other are synthesized, and any given polarization components are taken out from the diffracted light, whereby computation output between two pieces of data recorded in the area as two pieces of signal light can be obtained. That is, any computations such as addition, subtraction, and logical operations can be easily and quickly performed between data pieces such as two images recorded in the optical recording medium.

The optical recording medium of the present invention can record holograms with sufficient diffraction efficiency and has a recording layer serving as a slab optical waveguide, so that reading light inputted from an end face thereof can be guided through the recording layer.

The holographic recording and/or retrieval method and the holographic recording and/or retrieval apparatus of the present invention can record holograms with sufficient diffraction efficiency and retrieve recorded holograms without destroying them by guiding reading light inputted from an end face of the recording layer through it.

The entire disclosure of Japanese Patent Application No. 2001-83773 filed on Mar. 22, 2001 including specification, claims, drawings and abstract is incorporated herein by reference in its entirety.

What is claimed is:

1. An optical recording medium, comprising:
   a substrate;
   a recording layer, formed on a surface of the substrate, through which light having an incident angle of a predetermined value or more with respect to the surface is guided, and which changes a refractive index or absorption coefficient upon simultaneous irradiation of signal light of a predetermined wavelength and reference light, and can record a hologram by holding the changed refractive index or absorption coefficient; and
   a clad layer formed on the recording layer.

2. The optical recording medium according to claim 1, wherein the refractive index of the recording layer is higher than the refractive index of the substrate.

3. The optical recording medium according to claim 1, further comprising the clad layer having a lower refractive index than the recording layer.

4. The optical recording medium according to claim 1, wherein plural sets each comprising the recording layer and the clad layer are stacked.

5. The optical recording medium according to claim 1, wherein the recording layer is made of a polymer or a polymeric liquid crystal having photoinduced birefringence and a photoisomerizable group in a side chain.

6. The optical recording medium according to claim 5, wherein the photoisomerizable group contains an azobenzene structure.

7. The optical recording medium according to claim 5, wherein the polymer or polymeric liquid crystal comprises at least a sort of monomer selected from a polyester group.

8. A holographic recording and/or retrieval method, which records a hologram in an optical recording medium and/or retrieves a recorded hologram, comprising the steps of:
   during recording, recording a hologram by simultaneously irradiating a recording layer of the optical recording medium with signal light of a predetermined wavelength and reference light; and
   during retrieval, guiding reading light of a wavelength that does not change a refractive index or absorption coefficient held in the recording layer through the recording layer, and retrieving a hologram by diffracted light produced when the reading light is guided through the recording layer,
   the optical recording medium comprising a substrate and a clad layer formed on the recording layer, the recording layer being formed on a surface of the substrate, through which light having an incident angle of a predetermined value or more with respect to the surface is guided, and which changes a refractive index or absorption coefficient upon simultaneous irradiation of the signal light of the predetermined wavelength and reference light, and can record a hologram by holding the changed refractive index or absorption coefficient.

9. The holographic recording and/or retrieval method according to claim 8, wherein signal light holding first data information by means of an intensity distribution is applied to a predetermined area of the optical recording medium along with reference light, the intensity distribution of the signal light is recorded as a first hologram, a polarization state of one of the signal light and the reference light is changed to irradiate the predetermined area of the optical recording medium along with the reference light with signal light holding second data information by means of an intensity distribution, the intensity distribution of the signal light is recorded as a second hologram, and the first hologram and the second hologram can be retrieved by diffracted light produced when reading light is guided through the recording layer.

10. The holographic recording and/or retrieval method according to claim 8, wherein signal light holding data information by means of a polarization distribution is incident onto the optical recording medium along with reference light, the polarization distribution of the signal light is recorded as a hologram, and the recorded hologram is retrieved by diffracted light produced when reading light is guided through the recording layer.

11. The holographic recording and/or retrieval method according to claim 10, wherein the polarization distribution is created by turning a polarization angle of the signal light by a predetermined angle according to the data information.

12. A holographic recording and/or retrieval apparatus, which records a hologram in an optical recording medium and/or retrieves a recorded hologram, comprising:

a signal light irradiating unit that irradiates a predetermined area of a recording layer of the optical recording medium with signal light of a predetermined wavelength from a direction crossing with a guide direction of the recording layer;

a reference light irradiating unit that irradiates the predetermined area with reference light of a predetermined wavelength so as to change a refractive index or absorption coefficient of the recording layer by interference action with the signal light; and a reading light inputting unit that inputs reading light of a wavelength that does not change the refractive index or absorption coefficient held in the recording layer so as to guide it through the recording layer, the optical recording medium comprising a substrate and the a clad layer on the recording layer, recording layer being formed on a surface of the substrate, through which light having an incident angle of a predetermined value or more with respect to the surface is guided, and which changes the refractive index or absorption coefficient upon simultaneous irradiation of the signal light of the predetermined wavelength and reference light, and can record a hologram by holding the changed refractive index or absorption coefficient.

13. An optical recording medium comprising a recording layer, a clad layer formed on the recording layer, reading light guided through the recording layer being incident thereon to record a hologram capable of generating diffracted light.

14. The optical recording medium according to claim 13, wherein the reading light is light that cannot be recorded in the recording layer.

15. The optical recording medium according to claim 13, wherein:

the hologram is recorded by a change in a refractive index or absorption coefficient of the recording layer; and the reading light does not induce the change in the refractive index or absorption coefficient of the recording layer.

16. The optical recording medium according to claim 13, wherein the recording layer has a sheet-like shape and the reading light is incident on an end face of the recording layer.

17. An optical recording apparatus that records a hologram in a recording layer of an optical recording medium, comprising:

a recording unit that inputs reading light incident on an end face of the recording layer and records a hologram capable of generating diffracted light in the recording layer.

18. An optical retrieval apparatus that generates diffracted light from a recording layer of an optical recording medium in which a hologram is recorded, comprising:

a read unit that inputs reading light incident on an end face of the recording layer and generates the diffracted light from the recording layer.

* * * * *